United States Patent Office 3,798,284
Patented Mar. 19, 1974

---

3,798,284
PROCESS FOR THE PREPARATION OF SYNTHETIC
LUBRICATING OILS FROM OLEFINES
Renato Tesei, Pierleone Girotti, and Telemaco Floris, San Donato, Milanese, Italy, assignors to Snam Progetti S.p.A., San Donato, Milanese, Italy
No Drawing. Filed Dec. 30, 1970, Ser. No. 102,974
Claims priority, application Italy, Dec. 30, 1969, 26,427/69
Int. Cl. C07c 3/10
U.S. Cl. 260—683.15 D          20 Claims

ABSTRACT OF THE DISCLOSURE

Lubricating oils having improved characteristics may be synthesized by polymerizing certain linear alpha olefines in the presence of an inorganic catalyst system comprising:
(a) a compound of a transition metal from the IV to the VIII group of the Periodic System, and
(b) a compound of aluminum which is a linear polymer of polyiminic nature having the formula:

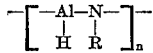

wherein $n$ is a number not higher than 50 and R is a hydrocarbon radical.

---

This invention relates to a process for the preparation of synthetic lubricating oils by means of polymerization of linear alpha olefines, such as are generally obtained from the wax cracking, having the general formula R—CH=CH$_2$, where R is an alkylic radical containing from 2 to 16 carbon atoms.

Processes suitable for obtaining synthetic oils starting from olefines mixtures are well known. Among the better known processes are the ones utilizing cationic catalysts.

In three co-pending Italian patent applications, i.e. Italian patent application No. 21,956 A/69, No. 21,987 A/69 and No. 21,988 A/69 of the Sept. 12, 1969 of the same assignor, are described processes of such a type which allow obtaining products of good properties.

On the other hand recent processes based on the use of stereospecific catalysts of polymerization have been developed such as for instance the ones known as co-ordinated anions the most of which are those of the Ziegler type.

We have discovered a process which makes it possible to obtain synthetic lubricating oils of very good properties by using a particular class of catalysts which are also of the coordinated anion type but of an inorganic nature, namely they are compounds completely free of metal-carbon bonds. The catalytic system used is formed by an active complex containing aluminum and another metal, generally of the group of the transition metals. It operates according to an anionic mechanism.

The lubricating oils obtained by means of the process of the present invention are by far best when compared with the mineral oils coming from the solvent refining of the high boiling petroleum fractions, the characteristics of which, even after addition of conventional additives cannot be sufficiently improved to satisfy the lubrication requirements growing ever more rigorous due to the evolution in the field of engine construction. The oils obtained through the present invention are remarkably higher also as compared with the synthetic oils produced from linear alpha olefines by means of polymerization with AlCl$_3$ or with di-tert alkylperoxides since these catalysts, operating through the cationic mechanism and through free radicals, give rise to a certain isomerization both of the starting olefines and of the produced polymer which limits its characteristics.

The synthetic lubricating oils obtained with the process of this invention present, without adding the additives, high viscosities, very high viscosity indices (higher than 135), low pouring points, very high resistance to the depolymerization, very good behavior at low temperatures, high susceptibility to the oxidation inhibitors and good lubricating properties.

According to our process the polymerization of the linear alpha olefines or of their mixtures, of the general formula

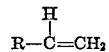

wherein R is an alkyl radical containing from 2 to 16 carbon atoms, with the purpose of obtaining liquid polymers is carried out in the presence of a catalytic system comprising a transition metal compound from IV to VIII group of the Periodic Table and an aluminum compound, which is a linear polymer of polyiminic nature having the formula:

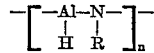

where $n$ is a number not higher than 50, preferably between 4 and 25, and R' is an alkyl or aryl or cycloalkyl radical.

Examples of transition metal compounds are: TiCl$_4$, TiCl$_3$, VCl$_4$, VOCl$_3$. VO(OC$_2$H$_5$)$_3$, ZrCl$_4$, FeCl$_3$, NiCl$_2$, CoCl$_2$ and the like.

The Al/transition metal atom ratio in the aforementioned catalytic systems, employed in this invention is comprised between 1.0 and 2.5. The process of the present invention, as we have already said, particularly applies to single olefines and to the fractions coming from the distillation of olefines obtained from the "wax cracking,." for instance in the range from C$_2$ to C$_4$, from C$_3$ to C$_5$, from C$_6$ to C$_8$, from C$_7$ to C$_9$, from C$_8$ to C$_{10}$ and so on, namely mixtures of alpha olefines, easily available on the market.

The polymerization reaction may be carried out by means of a solvent or not. When no solvent is used, the olefines themselves work as a means of reaction and generally the catalyst is formed by adding the two components of the catalytic system to the olefines themselves.

The hydrocarbons which may be used as solvents comprise the saturated hydrocarbons; like pentanes, hexanes, heptanes, octanes, nonanes, decanes, cycloparaffins such as cyclohexane, methylcyclohexane, dimethylcyclohexanes; aromatic hydrocarbons like benzene, toluene, and xylenes; chlorinated hydrocarbons such as chlorobenzene, fluorobenzene, dichlorobenzene and difluorobenzene. Mixtures of said hydrocarbons may be used.

Generally the selection of the solvent is made by bearing in mind that it must have a boiling point such that the olefines feed and the obtained polymers may be easily recovered for distillation. The amount may have a volume up to 10 times that of the fed olefines.

By means of the catalytic systems of this invention the reaction of polymerization is effected under hydrogen pressure. The necessary hydrogen pressure for obtaining polymers ranging in the lubricating oils fraction as to viscosity is from 5 to 40 kg./cm.$^2$. Generally when there is a higher pressure a production of oils with a lower viscosity and with a higher viscosity index is obtained.

The polymerization temperature in the process of the present invention ranges from −30° to 200° C., preferably between 80° and 150° C. In general higher temperatures in the presence of hydrogen give higher yields of lubricating oils having lower viscosity.

The weight ratio of olefine/transition metal compound, employed in the present invention varies in the range from 10:1 and 500:1, preferably between 50:1 and 200:1. Said ratio varies according to the purity of the olefines feed, to the absence or to the presence of a solvent, to the temperature and to the pressure of the hydrogen. The reaction time may vary from 1 hour to 5 hours, a reaction time of 3 hours generally being employed.

By using the catalytic system of the present invention the reaction vessel must be well cleaned and dried and washed out by an inert gas, for instance nitrogen. It is preferable that the alpha olefines from the wax cracking are subjected to a purification pretreatment for eliminating the compounds which, poisoning the catalyst, do not allow high conversions to be obtained.

The pretreatment may be carried out in different ways: by means of the exhausted catalyst itself; by means of anhydrous $TiCl_4$; by means of anhydrous $AlCl_3$; by means of $FeSO_4$ and concentrated $H_2SO_4$; for percolation on silica and/or through molecular sieves.

Generally, after the pretreatment, the olefines are washed with NaOH, water and at the end suitably deaerated and dehydrated and maintained in a dry nitrogen atmosphere. A conventional composition of the wax cracking olefines is reported in Table A.

TABLE A

Alpha-olefins composition for "wax cracking" with a range $C_7$–$C_9$.

|  | B.w. |
|---|---|
| Linear alpha-olefins | 79 |
| Branched alpha-olefins | 1 |
| Linear internal olefins | 5 |
| Branched internal olefins | 9 |
| Diolefins | 5 |
| Saturated hydrocarbons | 1 |

Distribution according to the number of the carbon atoms.

| | |
|---|---|
| $C_7$ (percent b.w.) | 31 |
| $C_8$ (percent b.w.) | 45 |
| $C_9$ (percent b.w.) | 24 |
| Specific gravity at 20° C. | 0.720 |
| Molecular weight | 111 |
| Bromine number, gr./100 gr. | 150 |

Similarly to the feed olefins, also the solvent and also two components of the catalytic system must be maintained in a dry nitrogen atmosphere.

The catalytic complex may be preformed in one of the solvents already indicated or may be formed "in situ" in the same olefins of the feed. The products obtained with the process of the invention present very few unsaturations (generally no more than one half unsaturation per molecule) but it is convenient to subject them to a further hydrogenation for the purpose of eliminating the residual unsaturations.

Furthermore, it is to be borne in mind that it is possible to mix oil cuts obtained in different operative conditions so as to obtain an oil with the desired properties.

The present invention is illustrated by way of the following examples, which report the use of the catalysts mentioned above. With such examples we do not intend to limit this invention.

EXAMPLE 1

Into a 1 l. autoclave provided with a stirrer and the cooling liquid circulation jacket accurately dried, deaerated and thermostatized, we first re-introduced 500 cc. (g. 360) of alpha-olefins of range from $C_7$ to $C_9$ which were purified with 0.2 $TiCl_4$. Then 33.90 cc. of a 1.21 mole solution of poly-(N-isopropyliminoalane) and 15.55 cc. of a 2.03 mole solution of $TiCl_4$ in hexane (g. 5.99 of $TiCl_4$) were added. The atom ratio Al/Ti in the mixture was 1.3; the ratio b.w. olefins/$TiCl_4$ was 60.

Into the reactor there were then introduced enough hydrogen to reach a pressure of 15 kg./cm.$^2$ and it then was heated under stirring till a temperature of 80° C. was held for 3 hours. During the test the pressure became lower and, at the same time, was continuously brought back to the initial value. The catalyst was then deactivated by adding water to the reaction mixture and stirring.

After separating the water phase, the oil phase was filtered and distilled at atmospheric pressure to remove the unreacted olefins. Then a distillation was carried out under vacuum at the absolute pressure of 1 mm. Hg, obtaining 18 g. of dimer and 228 g. of oil. The total conversion with respect to the olefins of the feed was 68.3% b.w. and the yield of oil was of 63.3% b.w. The characteristics of the oil obtained appear in Table I.

TABLE I

| Characteristics | Method | Synthetic oil of Example 1 |
|---|---|---|
| Specific gravity at 20° C | ASTM D 1481 | 0.8334 |
| Refraction index, $n_D^{20}$ | ASTM D 1747 | 1.4640 |
| Cinematic viscosity at— | | |
| 210° F., cst | ASTM D 445 | 20.65 |
| 100° F., cst | ASTM D 445 | 136.4 |
| Viscosity index | ASTM D 2270/A | 139 |
| Pouring point, ° C | ASTM D 97 | −45 |
| Ramsbottom carbon residue, percent b.w. | ASTM D 524 | 0.05 |
| Neutralization number, mg. KOH/g | ASTM D 974 | 0.04 |
| Molecular weight | T.V. osmometre [1] | 680 |
| Iodine number | I.P. 84 | 19 |

[1] T.V. osmometre means vapor pressure osmometre.

From the data reported in Table 1, it is possible to verify that the synthetic oil obtained through the process of the present invention has a high viscosity index (V.I.) and a low pouring point. From the value of the Iodine number and of the molecular weight it is deduced that the oil contains about 0.5 double bonds per molecule.

EXAMPLE 2

Into a deaerated 1 liter autoclave 500 cc. (gr. 360) of $C_7$–$C_9$ alpha-olefins previously purified with 0.2% of $TiCl_4$ were first introduced and then 37.30 cc. of 1.10 molar solution of poly-(N-butyl imino alane) and 15.55 cc. of a 2.03 molar solution of $TiCl_4$ in hexane (g. 5.99 of $TiCl_4$) were added. The atom ratio Al/Ti in the mixture was 1.3; the ratio by weight of olefins/$TiCl_4$ was 60.

After introducing into the reactor a hydrogen pressure of 15 kg./cm.$^2$ and heating for 3 hours at the temperature of 80° C., a distillation in the oil phase was carried out obtaining a conversion of 67.5% b.w. with a yield in oil of the 62.4% b.w. with respect to the fed olefins. The produced oil presented the characteristics reported in Table II.

TABLE II

| Characteristics | Method | Synthetic oil of Example 2 |
|---|---|---|
| Cinematic viscosity at— | | |
| 210° F., cst | ASTM D 445 | 21.35 |
| 100° F., cst | ASTM D 445 | 140.1 |
| Viscosity index | ASTM D 2270/A | 139 |
| Pouring point, ° C | ASTM D 97 | −45 |

EXAMPLE 3

Into a deaerated 1 liter autoclave, 500 cc. (g. 360) of $C_7$–$C_9$ alpha olefins previously purified with 0.2% of $TiCl_4$ were added.

Then 36.0 cc. of a 1.14 molar solution of poly-(N-phenil imino alane) and 15.55 cc. of a 2.03 molar solution of $TiCl_4$ (g. 5.99 of $TiCl_4$) were introduced.

The atom ratio Al/Ti in the mixture was 1.3; the ratio by weight olefins/$TiCl_4$ was 60.

After introducing into the reactor a pressure of hydrogen of 15 kg./cm.$^2$ and heating for 3 hours at the temperature of 80° C., the oil phase was distilled obtaining a conversion of the 69.1% by weight with a yield in oil of the 63.5% by weight with respect to the fed olefins.

The produced oil presented the characteristics reported in Table III.

TABLE III

| Characteristics | Method | Synthetic oil of Example 3 |
|---|---|---|
| Cinematic viscosity at— | | |
| 210° F., cst | ASTM D 445 | 19.91 |
| 100° F., cst | ASTM D 445 | 128.6 |
| Viscosity index | ASTM D 2270/A | 140 |
| Pouring point, °C | ASTM D 97 | −46 |

EXAMPLE 4

Into a deaerated 400 cc. autoclave, 100 cc. (72 gr.) of alpha-olefins ranging from $C_7$ to $C_9$, which were previously subjected to a treatment of purification with 0.2% of $TiCl_4$, were introduced. Successively, 5.0 cc. of 1.21 molar solution of poly-(N-isopropyl-imine-alane) and 4.65 cc. of a 1.0 molar solution of $VCl_4$ in toluene were added.

The atom ratio Al/V in the mixture was 1.3; the ratio by weight olefin/$VCl_4$ was 80.

After introducing hydrogen into the reactor until a pressure of 15 kg./cm.$^2$ and heating was reached for 3 hours at the temperature of 80° C., the catalyst was deactivated, the oil phase was distilled obtaining a conversion of 65% by weight and a oil yield of 61.3% by weight with respect to the fed olefins.

The produced oil presented the characteristics reported in Table IV.

TABLE IV

| Characteristics | Method | Synthetic oil of Example 4 |
|---|---|---|
| Cinematic viscosity at— | | |
| 210° F., cst | ASTM D 445 | 14.25 |
| 100° F., cst | ASTM D 445 | 87.77 |
| Viscosity index | ASTM D 2270/A | 141 |
| Pouring point, °C | ASTM D 97 | −48 |

EXAMPLE 5

By operating as in Example 4, to the 100 cc. (72 g.) of $C_7$-$C_9$ olefins, 15.3 cc. of the 1.21 molar solution of poly-(N-isopropyl-imine-alane) and g. 1.2 of anhydrous of $FeCl_3$ were subsequently added.

The atom ratio Al/Fe in the mixture was 2.5; the ratio by weight olefins/$FeCl_3$ was 60.

After introducing hydrogen to a pressure of 15 kg./cm.$^2$ and heating for 3 hours at the temperature of 80° C., the oil phase was distilled obtaining a conversion of 64 by weight and an oil yield of 60.2% by weight with respect to the fed olefins.

The oil presented the characteristics reported in Table V.

TABLE V

| Characteristics | Method | Synthetic oil of Example 5 |
|---|---|---|
| Cinematic viscosity at— | | |
| 210° F., cst | ASTM D 445 | 51.40 |
| 100° F., cst | ASTM D 445 | 369.4 |
| Viscosity index | ASTM D 2270/A | 133.4 |
| Pouring point, °C | ASTM D 97 | −42 |

EXAMPLE 6

The oil of Example 1 was hydrogenated to saturate completely the olefinic double bonds.

The hydrogenation was effected in autoclave by using a platinum supported on alumina catalyst at the following conditions: temperature 180° C., pressure of hydrogen 50 kg./cm.$^2$, time 2 hours.

The characteristics of the hydrogenated oil are shown in Table VI.

TABLE VI

| Characteristics | Method | Hydrogenated oil of Example 6 |
|---|---|---|
| Specific gravity at 20° C | ASTM D 1481 | 0.8321 |
| Refraction index, $n_D^{20}$ | ASTM D 1747 | 1.4628 |
| Cinematic viscosity at— | | |
| 210° F., cst | ASTM D 445 | 21.42 |
| 100° F., cst | ASTM D 445 | 143.8 |
| Viscosity index | ASTM D 2270/A | 138 |
| Pouring point, °C | ASTM D 97 | −42 |
| Ramsbottom carbon residue, percent b.w. | ASTM D 524 | 0.07 |
| Neutralization number, mg. KOH/g | ASTM D 974 | <0.04 |
| Molecular weight | T.V. osmometer | 690 |

By comparing these characteristics with the ones of the unhydrogenated oil of Example 1, it is possible to deduce that the hydrogenation does not substantially change the oil properties, which therefore, remain very satisfactory.

EXAMPLES 7–10

By operating in a way similar to Example 1 with the difference of employing atom ratios Al/Ti different from 1.3. In the Example 7 the ratio Al/Ti was 1.0 in the Example 8 was 1.15, in the Example 9 was 1.45, in the Example 10 was 2.0.

The conversion was very low only with the ratio Al/Ti=1.0 (12% b.w. with respect with fed olefins), while with the other ratios it ranged from 62 to 68%.

The characteristics of the oils obtained with variable ratio Al/Ti are reported in Table VII.

TABLE VII

| Characteristics | Method | Example 7 | Example 8 | Example 9 | Example 10 |
|---|---|---|---|---|---|
| Atom ratio Al/Ti | | 1.0 | 1.15 | 1.45 | 2.0 |
| Cinematic viscosity at— | | | | | |
| 210° F., cst | ASTM D 445 | 8.55 | 24.93 | 16.78 | 12.42 |
| 100° F., cst | ASTM D 455 | 54.26 | 173.5 | 107.9 | 73.11 |
| Viscosity index | ASTM D 2270/A | 130 | 137 | 140 | 143 |
| Pouring point, °C | ASTM D 97 | −43 | −43 | −46 | −45 |

From such a table, it is possible to deduce that oils with different characteristics may be obtained according to the ratio Al/Ti used.

EXAMPLE 11

The Shear Stability test was effected on the synthetic hydrogenated oil of Example 6 containing no additives.

The test was effected by means of a Raytheon sonic oscillator (ASTM D 2603–67T) for a time of 15 minutes at 100° F.

At the end the variation of the viscosity was measured, at the temperature of 210° F.

The results are reported in Table VIII.

TABLE VIII

| | Cinematic viscosity, cst. at 210° F. | | |
|---|---|---|---|
| Oil type | Initial | After the shear stability test | Cinematic viscosity variation cst. at 210° F. |
| Hydrogenated synthetic soil of Example 6 | 21.42 | 21.20 | 0.22 |

These results show that the hydrogenated synthetic oil presents a very high resistance to depolymerization.

EXAMPLE 12

This example relates to the determination of the lubricating characteristics carried out on the hydrogenated synthetic oil of Example 6 containing no additives and on a commercial mineral oil extracted with a solvent, also containing no additives and having about the same viscosity (20.90 cst. at 210° F.). The determination was effected by examining the oils with the Shell Four Ball Wear Tester, taking as measure of the oil lubricating properties, the wear diameter formed on the metal. The tests were effected at 600 r./m., at 80° C., 15 kg. of load during 2 hours.

The results were reported in Table IX.

TABLE IX

| Oil type: | Wear diameter, mm. |
|---|---|
| Synthetic hydrogenated oil of Example 6 | 0.66 |
| Mineral oil extracted with solvent | 0.80 |

These results show that the hydrogenated synthetic oil produced according to the process of the invention presents lubricating properties better than the ones of conventional oil extracted with solvent.

EXAMPLES 13–14

They are similar to Example 1 with the difference that pressures were used which were different from 15 kg./cm.$^2$ and exactly 5 kg./cm.$^2$ in the Example 13 and 40 kg./cm.$^2$ in the Example 14. The total conversion and the oil yields were respectively of the 65% b.w. and 60.5% b.w. in Example 13 and 72.8% and 65.8% b.w. in Example 14.

The characteristics of the two oils are reported in Table X.

TABLE X

| Characteristics | Method | Synthetic oil of— | |
|---|---|---|---|
| | | Ex. 13 | Ex. 14 |
| Specific gravity at 20° C | ASTM D 1481 | 0.8377 | 0.8294 |
| Refraction index, $n_D^{20}$ | ASDM D 1747 | 1.4675 | 1.4620 |
| Cinematic viscosity at— | | | |
| 210° F., cst | ASTM D 445 | 52.5 | 13.98 |
| 100° F., cst | ASTM D 445 | 361.3 | 4.68 |
| Viscosity Index | ASTM D 2270/A | 133 | 142 |
| Pouring point, ° C | ASTM D 97 | −42 | −48 |
| Ramsbottom carbon residue, percent b.w. | ASDM D 524 | 0.05 | 0.04 |
| Molecular weight | T.V. osmometre | 890 | 640 |

From the results of Table X it is deduced that by operating with different pressures, oils extending over a wide range and having high viscosity indices may be obtained. Generally, a higher viscosity corresponds to a lower viscosity index.

EXAMPLES 15–16

They are similar to Example 1 with the difference that the polymerization reactions were carried out at temperature different from 80° C. and exactly 25° C. and 100° C. The conversion and the oil yield were respectively of 28% and of 24% b.w. in Example 15; of 65% and of 57% in Example 16. The characteristics of the two oils are reported in Table XI.

TABLE XI

| Characteristics | Method | Synthetic oil of— | |
|---|---|---|---|
| | | Ex. 15 | Ex. 16 |
| Specific gravity at 20° C | ASTM D 1481 | 0.8348 | 0.8338 |
| Refraction index, $n_D^{20}$ | ASTM D 1747 | 1.4662 | 1.4648 |
| Cinematic viscosity at— | | | |
| 210° F., cst | ASTM D 445 | 34.7 | 20.03 |
| 100° F., cst | ASTM D 445 | 252.7 | 135.2 |
| Viscosity index | ASTM D 2270/A | 134 | 138 |
| Pouring point, ° C | ASTM D 97 | −42 | −43 |

From the results above indicated it is possible to deduce that by carrying out the polymerization at low temperature the conversion is reduced and the oil viscosity increases while at high temperature the conversion increases and the oil viscosity decreases. Generally higher viscosity corresponds to a lower viscosity index and vice versa.

EXAMPLE 17

It is analogous to the Example 1 with the difference that a solvent was used.

In the 1 lt. autoclave 290 cc. (191 g.) of hexane, 13.5 cc. of a 1.21 molar solution of poly-(N-isopropilimine alane), 200 cc. of alpha-olefines $C_7$–$C_9$ (g. 144) and at the end 6.2 cc. of 2.03 molar solution of $TiCl_4$ were introduced.

The catalytic complex formed also in this case "in situ."

The atom ratio Al/Ti was 1.3; the ratio b.w. olefins/$TiCl_4$ was 60; the ratio by weight olefins/solvent was 0.75.

After introducing into the autoclave a hydrogen pressure of 15 kg./cm.$^2$ and heating during 3 hours at the temperature of 80° C., the oil phase was distilled obtaining a conversion of 55.0% and an oil yield of 43.7% b.w. The characteristics of the produced oil are shown in Table XII.

TABLE XII

| Characteristics | Method | Synthetic oil of Ex. 17 |
|---|---|---|
| Specific gravity at 20° C | ASTM D 1481 | 0.8326 |
| Refraction index, $n_D^{20}$ | ASTM D 1747 | 1.4650 |
| Cinematic viscosity at— | | |
| 210° F., cst | ASTM D 445 | 18.64 |
| 100° F., cst | ASTM D 445 | 128.5 |
| Viscosity index | ASTM D 2270/A | 137 |
| Pouring point, ° C | ASTM D 97 | −46 |

EXAMPLE 18

It is analogous to the Example 1 with the difference that the polymerization reaction was effected for a period of 1.5 hours.

The conversion and the oil yield were respectively of 67.1% and of 62.5% b.w. with respect to the fed olefins.

The characteristics of the oil produced are reported in Table XIII.

TABLE XIII

| Characteristics | Method | Synthetic oil of Ex. 18 |
|---|---|---|
| Specific gravity at 20° C | ASTM D 1481 | 0.8331 |
| Refraction index, $n_D^{20}$ | ASTM D 1747 | 1.4650 |
| Cinematic viscosity at— | | |
| 210° F., cst | ASTM D 445 | 20.32 |
| 100° F., cst | ASTM D 445 | 134.2 |
| Viscosity index | ASTM D 2270/A | 139 |
| Pouring point, ° C | ASTM D 97 | −44 |

By comparing these results with the ones of Example 1, it is possible to deduce that oils with good yields and with very good characteristics may be obtained, also by carrying out the reaction of polymerization for the time of 1.5 hours.

What is claimed is:

1. Process for obtaining synthetic lubricating oils through polymerization of a linear alpha olefin or a mixture containing linear alpha-olefins having the formula R—CH=CH$_2$ where R is a hydrocarbon radical of 2 from 16 carbon atoms, in presence of hydrogen at a pressure between 5 and 40 kg./cm.$^2$ and a catalytic system comprising:
   (a) a compound of a transition metal from the IV to the VIII group of the Periodic Table jointly with
   (b) a compound of aluminum which is a linear polymer of polyiminic nature of formula

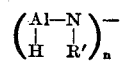

wherein: $n$ is a number between 4 and 50 and R' is a hydrocarbon radical.

2. Process according to claim 1 wherein the polymerization temperature is in the range from −30° C. and 200° C. and the ratio of olefin/transition metal compound is in the range of from 10:1 to 500:1.

3. Process according to claim 1 wherein the pressure is sufficient to maintain the system in a liquid phase.

4. Process according to claim 1 wherein the ratio of olefin/transition metal compound ranges from 50:1 to 200:1.

5. Process according to claim 1 characterized in that it is operated in presence of a hydrocarbon solvent.

6. Process according to claim 5 wherein the solvent is selected from the group consisting of the saturated hydrocarbons, the aromatic hydrocarbons, the halogenated hydrocarbons and mixtures thereof.

7. Process according to claim 6 wherein the saturated hydrocarbons are selected from the group consisting of pentanes, hexanes, octanes, nonanes and decanes.

8. Process according to claim 6 wherein the saturated hydrocarbons are cycloparaffins selected from the group consisting of cyclohexane and alkylcyclohexanes.

9. Process according to claim 6 wherein the aromatic solvent is selected from the group consisting of benzene and toluene.

10. Process according to claim 6 wherein the halogenated hydrocarbon solvent is selected from the group consisting of mono and dichlorobenzene and mono and difluorobenzenes.

11. Process according to claim 5 wherein the volume of the employed solvent is up to 10 times that of the olefinic feed.

12. Process according to claim 1 where the solvent is the olefinic feed itself.

13. Process according to claim 1 wherein a mixture of $C_7$–$C_9$ linear alpha olefins is employed.

14. Process according to claim 2 wherein the temperature ranges between 80° and 150° C.

15. Process according to claim 1 wherein the polymerization reaction is carried out within a time period of 1 to 5 hours.

16. Process according to claim 1 wherein the Al/transition metal ratio is between 1.0 and 2.5.

17. Process according to claim 1 wherein the component (a) of the catalytic system is selected from the group consisting of $TiCl_4$, $VCl_4$, and $FeCl_3$.

18. Process according to claim 1 wherein the fed olefin is selected from the group consisting of individual linear alpha olefins and mixtures of alpha olefins.

19. Process according to claim 18 wherein the mixture of alpha olefins is a fraction obtained by the distillation of the olefins obtained by means of the wax cracking process.

20. Process according to claim 15 wherein the polymerization reaction time is 3 hours.

References Cited

UNITED STATES PATENTS

| | | | |
|---|---|---|---|
| 3,467,639 | 9/1969 | Marconi et al. | 252—429 R |
| 3,470,138 | 9/1969 | Marconi et al. | 252—431 N |
| 3,113,167 | 12/1963 | Sauer | 260—683.15 |
| 3,156,736 | 11/1964 | Southern et al. | 260—683.15 |
| 3,346,662 | 10/1967 | Antonsen | 260—683.15 |
| 3,328,366 | 6/1967 | Nakaguchi et al. | 260—683.15 |
| 3,403,197 | 9/1968 | Seelbach et al. | 260—683.15 |

OTHER REFERENCES

Antonsen et al.: I & EC Product Research and Development, vol. 2, No. 3, September 1963, pp. 224–228.

PAUL M. COUGHLAN, JR., Primary Examiner

U.S. Cl. X.R.

252—59; 260—683.9